(12) United States Patent
Reed et al.

(10) Patent No.: US 7,129,595 B2
(45) Date of Patent: Oct. 31, 2006

(54) HYBRID ELECTRO-MECHANICAL VEHICULAR TRANSMISSION HAVING MULTIPLE MODULAR MOTOR/GENERATORS ASSEMBLED FROM LIKE COMPONENTS

(75) Inventors: William S. Reed, Greenfield, IN (US); James A. Raszkowski, Indianapolis, IN (US); Edward L. Kaiser, Rochester Hills, MI (US); Joel E. Mowatt, Zionsville, IN (US)

(73) Assignee: General Motors Corporation, Detroit, MI (US)

( * ) Notice: Subject to any disclaimer, the term of this patent is extended or adjusted under 35 U.S.C. 154(b) by 67 days.

(21) Appl. No.: 11/063,328

(22) Filed: Feb. 22, 2005

(65) Prior Publication Data

US 2005/0205335 A1 Sep. 22, 2005

Related U.S. Application Data

(60) Provisional application No. 60/555,141, filed on Mar. 22, 2004.

(51) Int. Cl.
*F02N 11/04* (2006.01)

(52) U.S. Cl. .......................................... 290/46; 174/50

(58) Field of Classification Search ................. 174/50, 174/50.1, 50.2, 50.24
See application file for complete search history.

(56) References Cited

U.S. PATENT DOCUMENTS

| | | | | |
|---|---|---|---|---|
| 3,590,262 | A | * | 6/1971 | Sheffield et al. ............... 290/46 |
| 6,005,297 | A | * | 12/1999 | Sasaki et al. ................ 290/4 C |
| 6,208,036 | B1 | * | 3/2001 | Evans et al. ................... 290/46 |
| 6,984,783 | B1 | * | 1/2006 | Kusumi et al. ................ 174/50 |
| 7,005,764 | B1 | * | 2/2006 | Petersen ........................ 310/44 |
| 2004/0266241 | A1 | * | 12/2004 | Tsukashima et al. ......... 439/212 |
| 2005/0208782 | A1 | * | 9/2005 | Reed et al. .................... 439/34 |

FOREIGN PATENT DOCUMENTS

| | | | | |
|---|---|---|---|---|
| EP | | 54081 | A1 * | 6/1982 |
| EP | | 980994 | A2 * | 2/2000 |
| JP | | 2000135931 | A * | 5/2000 |

* cited by examiner

*Primary Examiner*—Joseph Waks
(74) *Attorney, Agent, or Firm*—Christopher DeVries

(57) ABSTRACT

An improved hybrid electro-mechanical vehicular transmission includes motor/generator modules assembled from like components. This is accomplished by providing "punch-out" tabs on the motor/generator module housing enabling the housing to be used on either the first or second motor/generator module within a hybrid electro-mechanical vehicular transmission, thus enabling like components to be used within both the first and second motor/generator module.

14 Claims, 3 Drawing Sheets

HYBRID ELECTRO-MECHANICAL VEHICULAR TRANSMISSION HAVING MULTIPLE MODULAR MOTOR/GENERATORS ASSEMBLED FROM LIKE COMPONENTS

CROSS-REFERENCE TO RELATED APPLICATIONS

This application claims the benefit of U.S. Provisional Application No. 60/555,141, filed Mar. 22, 2004, which is hereby incorporated by reference in its entirety.

TECHNICAL FIELD

The present invention relates to a hybrid electro-mechanical vehicular transmission having motor/generator modules assembled from like components.

BACKGROUND OF THE INVENTION

Dual motor hybrid electro-mechanical vehicular transmissions have traditionally used non-modular motor/generator units with separate and independent electrical wiring connections for each motor. In an effort to increase production line efficiency and product quality, auto manufacturers have adopted modular assembly processes. This type of process allows part assemblies to be manufactured and tested off-site and subsequently shipped to the assembly plant where the modular assemblies are installed. An additional philosophy that is often employed in manufacturing is economies of scale. The basic premise of economies of scale is that production on a large scale may result in a lower piece cost. For this reason, manufacturers strive to use the like parts within different modules or part assemblies. By using like parts within different part assemblies, a lower piece cost may be achieved, piece quality may improve, and part confusion may diminish.

SUMMARY OF THE INVENTION

The present invention provides an improved hybrid electro-mechanical vehicular transmission having motor/generator modules assembled from like components. This is accomplished by providing "punch-out" tabs on the motor/generator module housing enabling the housing to be used on either the first or second motor/generator module within a hybrid electro-mechanical vehicular transmission, thus enabling like components to be used within both the first and second motor/generator module.

By reducing the number of components that are unique to the first and second motor/generator module, the cost, complexity, assembly time, spatial "footprint", and part confusion may be reduced, while part quality may increase.

Accordingly, the present invention provides a hybrid electro-mechanical vehicular transmission having a transmission main housing configured to receive a plurality of motor/generator modules. Each motor/generator module includes an electric motor/generator having a stator and rotor assembly and an electrical connector in electrical communication with the motor/generator. Also provided is a drum having a module housing operable to contain one of the electric motors and a module cover positioned at an open end of the module housing and to provide attachment to the transmission main housing. Additionally, the present invention provides a plurality of "punch-out" tabs formed integrally with the module housing and operable to create windows through which the electrical connections may pass. The plurality of "punch-out" tabs are operable to position and stabilize the electrical connector.

The module housing may be formed by flow forming and the module cover may be formed by stamping. The module cover may have three mounting members radially spaced at 120 degree increments on the periphery of the module cover and operable to mount each of the motor/generators, which may number two, within the transmission main housing.

Additionally, each of the plurality of motor/generator modules may have a plurality of lubrication and cooling inlet ports and at least one lubrication and cooling exhaust port centered at top dead center and bottom dead center of the motor/generator module respectively.

Yet another aspect of the present invention is a hybrid electro-mechanical vehicular transmission having a transmission main housing with a first and second module side to receive respectively one of two motor/generator modules. Each of the motor/generator modules include an electric motor/generator having a stator and rotor assembly and an electrical connection in electrical communication with the motor/generator. Also provided is a drum defining a module housing containing the motor/generator and having a module cover portion. The module cover portion is configured with a mounting pattern that aligns differently in the main housing with the electrical connection of one module with respect to the first module side of the main housing than with the electrical connection of the other module with respect to the second side of the main housing. This will ensure that only one module can be placed in the first module side of the main housing and only the other module can be placed in the second module side of the main housing.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
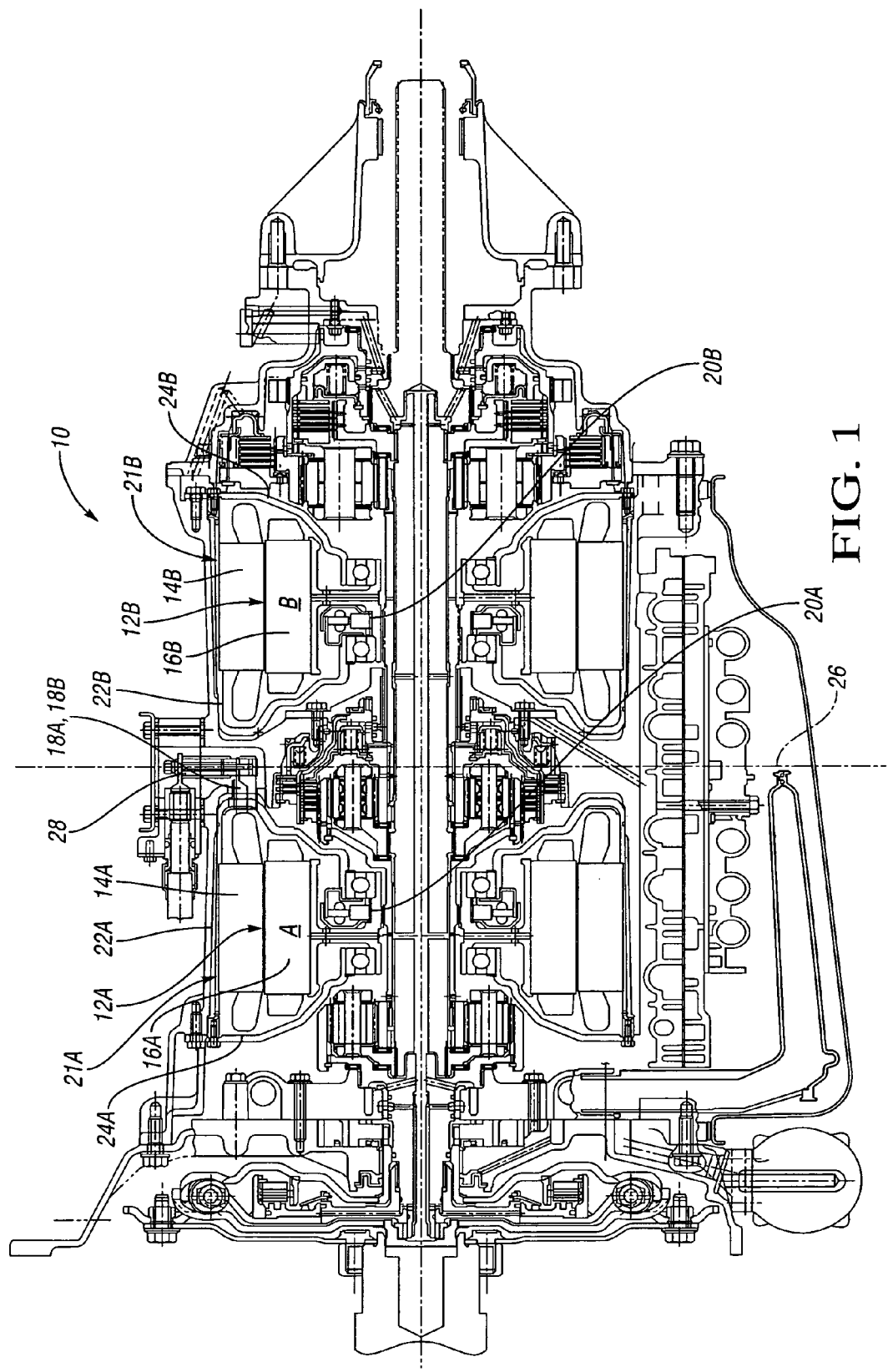
FIG. 1 is a schematic cross-sectional view of a hybrid electro-mechanical vehicular transmission having a first (A) and a second (B) motor/generator module.

In FIG. 1 there is shown a side elevational sectional view of a hybrid electro-mechanical vehicular transmission 10 having a first motor/generator module A, and a second motor/generator module B. The motor/generator modules A and B may be operated in various modes to accelerate and drive the vehicle, start the engine, brake the vehicle, and charge the batteries (not shown). Each of the motor/generator modules A and B include a motor/generator 12A and 12B respectively each having a stator 14A and 14B circumscribing a rotor 16A and 16B. The motor/generator modules A and B also include motor/generator power connectors 18A and 18B and motor/generator position and speed sensors 20A and 20B. A drum 21A and 21B defines a module housing 22A and 22B which is operable to contain the stator 14A and 14B, rotor 16A and 16B, motor/generator power connection 18A and 18B, and the motor/generator position and speed sensor 20A and 20B for each of the first motor/generator module A and the second motor/generator module B. In the preferred embodiment, the module housing 22A and 22B will be flow formed. A module cover 24A and 24B cooperates with the module housing 22A and 22B to contain the elements therein. In the preferred embodiment, the module cover 24A and 24B will be stamped from metal sheet stock.

Figure 2:
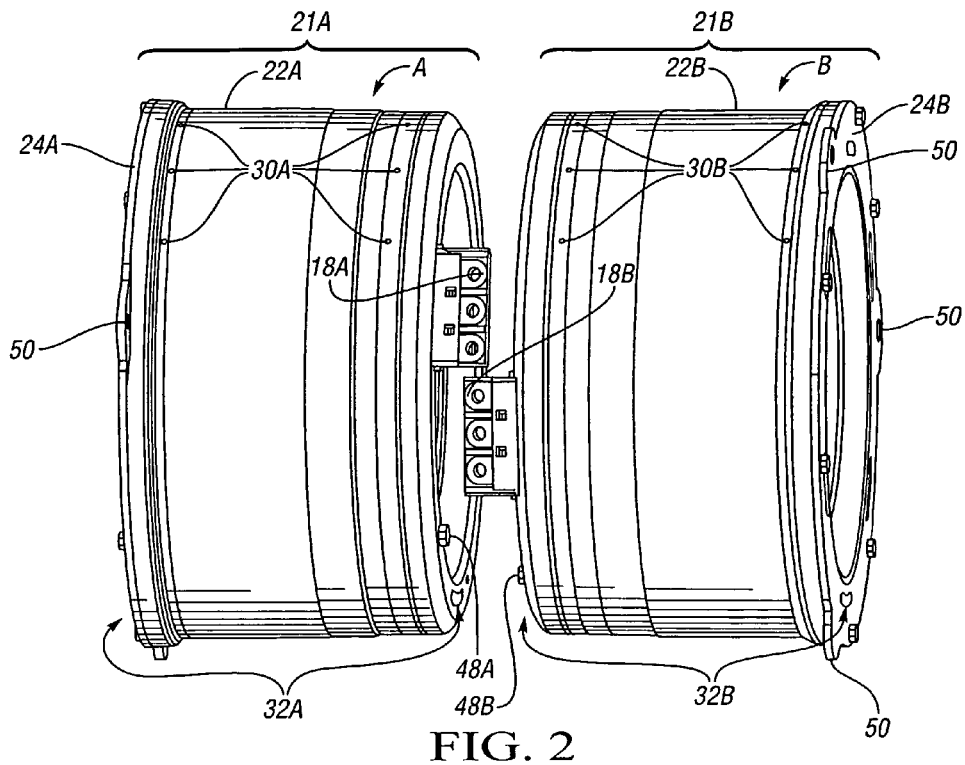
FIG. 2 is a left side perspective view of a first (A) and a second (B) motor/generator module illustrating the preferred orientation when placed within the hybrid electro-mechanical vehicular transmission.

In FIG. 2 there is shown a side perspective view of the first motor/generator module A and the second motor/generator module B, illustrating the preferred orientation when placed within the hybrid electro-mechanical vehicular transmission 10. The motor/generator modules A and B are each lubricated and cooled by a bath of transmission fluid passing through a plurality of lubrication and cooling inlet ports 30A and 30B formed within, and centered about the top dead center of the drum 21A and 21B respectively. The transmission fluid subsequently passes over the stator 14A and 14B and rotor 16A and 16B and carries the rejected heat energy through the lubrication and cooling exhaust ports 32A and 32B centered about bottom dead center of the drum 21A and 21B.

Referring again to FIG. 1, the motor/generator modules A and B are distinct orientations of like components. While the motor/generator modules A and B face opposite directions (i.e., they are mirror images of one another about a vertical centerline 26), it is preferred that they provide access for a common transmission electrical terminal assembly 28 to the motor/generator power connections 18A and 18B on a common side of the hybrid electro-mechanical vehicular transmission 10. Such alignment is typically not achievable with identical motor/generator modules. The first motor/generator module A cannot be rotated about the vertical centerline 26, and subsequently "clocked" (i.e., partially rotated about the central axis of the hybrid electro-mechanical vehicular transmission 10) such that the motor/generator power connection 18A is in the proper orientation to create the second motor/generator module B, as shown in FIG. 2. This action is proscribed by the need to maintain the plurality of lubrication and cooling inlet ports 30A centered about the top dead center of the drum 21A, and the desire to maintain the lubrication and cooling exhaust ports 32A centered about bottom dead center of the drum 21A.

Figure 3:
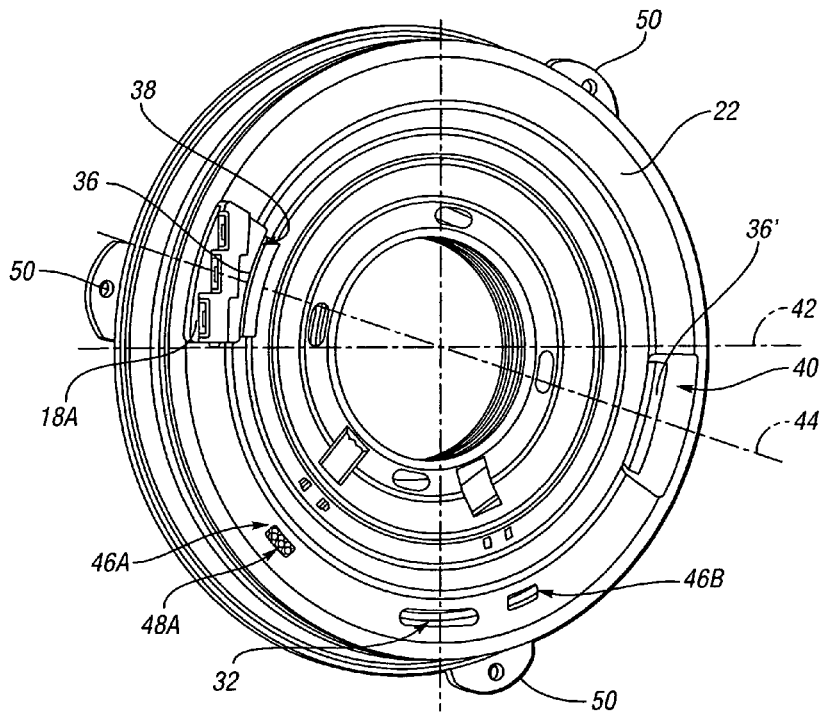
FIG. 3 is a rear perspective view of a drum illustrating the module housing having "punch-out" tabs consistent with the present invention.

As shown in FIG. 3, the present invention provides module housings 22 each having two "punch-out" tabs 36 and 36'. These "punch-out" tabs 36 and 36' are formed during the forming process of the module housing 22. When the "punch-out" tab 36 is formed, a first window 38 is created through which motor/generator power connections 18A will pass. Alternately, when the "punch-out" tab 36' is formed, a second window 40 is created through which motor/generator power connections 18B (shown in FIG. 2) will pass.

The "punch-out" tabs 36 and 36' function to locate and stabilize the motor/generator power connectors 18A and 18B during connection to the electrical terminal assembly 28 (shown in FIG. 1).

The first window 38 is disposed above the horizontal axis line 42, and the second window 40 is disposed below the horizontal axis line 42, with the first window 38 and second window 40 radially centered opposite one another in the module housing 22 along line 44.

By employing "punch-out" tabs 36 and 36' in such a way, the proper orientation for the lubrication and cooling inlet ports 30A and 30B and the lubrication and cooling outlet ports 32A and 32B may be maintained regardless of whether motor/generator power connections 18 passes through first window 38 or second window 40. Accordingly, the window through which the motor/generator power connections 18 passes will determine whether a first motor/generator module A is created or a second motor/generator module B is created.

In addition, the module housing 22 defines two sensor wiring windows 46A and 46B to enable electrical connection between the transmission control module (not shown) and the motor/generator position and speed sensors 20A and 20B. The sensor wiring windows 46A and 46B are positioned incongruently, such that after the first motor/generator module A and the second motor/generator module B are positioned within the hybrid electro-mechanical vehicular transmission 10, the sensor wiring windows 46A and 46B provide non-adjacent locations for wiring connector 48A and 48B (shown in FIG. 2). The wiring connectors 48A and 48B are the terminal ends leading form the motor/generator position and speed sensors 20A and 20B respectively. Therefore, the connections to the wiring connectors 48A and 48B may be error-proofed by utilizing differing wiring harness (not shown) lead lengths.

Figure 4:
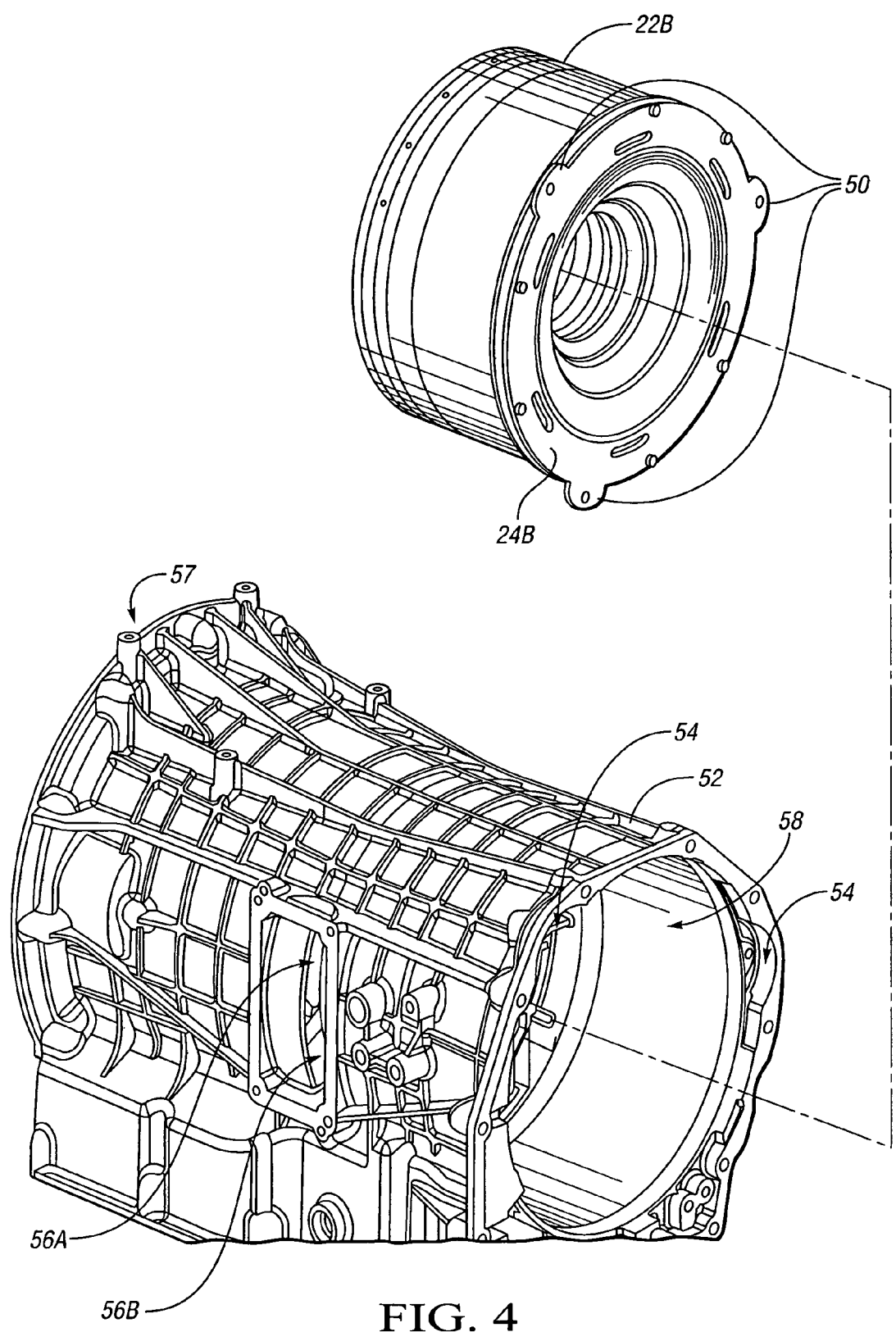
FIG. 4 is a fragmentary exploded view of a hybrid electro-mechanical vehicular transmission illustrating the placement of the second (B) motor/generator module therein as well as the main housing power wire openings.

Referring to FIG. 4, the module cover 24B provides three mounting members 50, spaced at 120 degree intervals, for bolting the motor/generator module B to the transmission main housing 52. Likewise, as shown in FIG. 2 and 3, the module cover 24A provides three mounting members 50, spaced at 120 degree intervals, for bolting the motor/generator module A to the transmission main housing 52. The transmission main housing 52 has mounting cavities 54 for receiving the module cover mounting members 50. Additionally, module connection openings 56A and 56B, defined by the main transmission housing 52, are spaced in such a way to provide clearance for the motor/generator power connections 18A and 18B. The 120° pattern of the mounting cavities 54 align differently in the transmission main housing 52 with the first and the second main housing power wire openings 56A and 56B, such that only a first motor/generator module A can be placed in the first module side 57 of the main transmission housing 52. Accordingly, only a second motor/generator module can be placed in the second module side 58 of the transmission main housing 52, thus providing additional assembly error proofing. Although like components are used for both motor/generator modules A and B, unique positioning features differentiate the first motor/generator module A from the second motor/generator module B.

By reducing the number of components that are unique to the first and second motor/generator module A and B, the cost, complexity, assembly time, spatial "footprint", and part confusion may be reduced, while part quality may increase.

While the best modes for carrying out the invention have been described in detail, those familiar with the art to which this invention relates will recognize various alternative designs and embodiments for practicing the invention within the scope of the appended claims.

The invention claimed is:

1. A hybrid electro-mechanical vehicular transmission comprising:
   a transmission main housing configured to receive a plurality of motor/generator modules, each of said plurality of motor/generator modules having:
   an electric motor/generator having a stator and rotor assembly;
   an electrical connector in electrical communication with said motor/generator;
   a drum having a module housing operable to contain one of said electric motors, and a module cover positioned at an open end of said module housing and to provide attachment to said transmission main housing; and a plurality of "punch-out" tabs formed integrally with said module housing and operable to create windows through which said electrical connections may pass, said plurality of "punch-out" tabs being operable to position and stabilize said electrical connector.

2. The hybrid electro-mechanical vehicular transmission of claim 1, wherein said module housing is formed by flow forming.

3. The hybrid electro-mechanical vehicular transmission of claim 1, wherein said module cover is formed by stamping.

4. The hybrid electro-mechanical vehicular transmission of claim 1, wherein module cover has three mounting members radially spaced at 120 degree increments on the periphery of said module cover and operable to mount each of said motor/generators within said transmission main housing.

5. The hybrid electro-mechanical vehicular transmission of claim 1, wherein said motor/generator modules number two.

6. The hybrid electro-mechanical vehicular transmission of claim 1, wherein each of said plurality of motor/generator modules have a plurality of lubrication and cooling inlet ports and at least one lubrication and cooling exhaust port centered at top dead center and bottom dead center of said motor/generator module respectively.

7. A hybrid electro-mechanical vehicular transmission comprising:

a transmission main housing configured to receive two motor/generator modules, each of said motor/generator modules having:

an electric motor/generator having a stator and rotor assembly;

an electrical connector in electrical communication with said motor/generator;

a drum having a module housing operable to contain one of said electric motors, and a module cover positioned at an open end of said module housing and to provide attachment to said transmission main housing; and a plurality of "punch-out" tabs formed integrally with said module housing and operable to create windows through which said electrical connections may pass, said plurality of "punch-out" tabs being operable to position and stabilize said electrical connector.

8. The hybrid electro-mechanical vehicular transmission of claim 7, wherein said module housing is formed by flow forming.

9. The hybrid electro-mechanical vehicular transmission of claim 7, wherein said module cover is formed by stamping.

10. The hybrid electro-mechanical vehicular transmission of claim 7, wherein module cover has three mounting members radially spaced at 120 degree increments on the periphery of said module cover and operable to mount each of said motor/generator within said transmission main housing.

11. The hybrid electro-mechanical vehicular transmission of claim 7, wherein each of said plurality of motor/generator modules have a plurality of lubrication and cooling inlet ports and at least one lubrication and cooling exhaust port centered at top dead center and bottom dead center of said motor/generator module respectively.

12. A hybrid electro-mechanical vehicular transmission comprising:

a transmission main housing having a first and second module side to receive respectively one of two motor/generator modules, each of said motor/generator modules having:

an electric motor/generator having a stator and rotor assembly;

an electrical connector in electrical communication with said motor/generator; and a drum defining a module housing containing said motor/generator, and having a module cover portion configured with a mounting pattern which aligns differently in said main housing with said electrical connection of one module with respect to said first module side of said main housing than with said electrical connection of the other module with respect to said second side of said main housing so that only one module can be placed in said first module side of said main housing and only said other module can be placed in said second module side of said main housing.

13. The hybrid electro-mechanical vehicular transmission of claim 12, wherein module cover has three mounting members radially spaced at 120 degree increments on the periphery of said module cover and operable to mount each of said motor/generators within said transmission main housing.

14. The hybrid electro-mechanical vehicular transmission of claim 12, wherein each of said motor/generator modules have a plurality of lubrication and cooling inlet ports and at least one lubrication and cooling exhaust port centered at top dead center and bottom dead center of said motor/generator modules respectively.

* * * * *